(12) United States Patent
Clabes et al.

(10) Patent No.: US 7,051,221 B2
(45) Date of Patent: May 23, 2006

(54) PERFORMANCE THROTTLING FOR TEMPERATURE REDUCTION IN A MICROPROCESSOR

(75) Inventors: Joachim Gerhard Clabes, Austin, TX (US); Michael Stephen Floyd, Austin, TX (US); Ronald Nick Kalla, Round Rock, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 10/425,399

(22) Filed: Apr. 28, 2003

(65) Prior Publication Data

US 2004/0215988 A1  Oct. 28, 2004

(51) Int. Cl.
*G06F 1/32* (2006.01)
(52) U.S. Cl. .................... 713/320; 713/323; 713/324
(58) Field of Classification Search ......... 713/300–324
See application file for complete search history.

(56) References Cited

U.S. PATENT DOCUMENTS 5,829,879 A * 11/1998 Sanchez et al. ............. 374/178
6,029,006 A * 2/2000 Alexander et al. .......... 713/323
6,047,248 A * 4/2000 Georgiou et al. ........... 702/132
6,192,479 B1 * 2/2001 Ko ............................. 713/300
6,282,663 B1 * 8/2001 Khazam ..................... 713/320

* cited by examiner

*Primary Examiner*—Dennis M. Butler
(74) *Attorney, Agent, or Firm*—Joseph P. Lally; Casimer K. Salys

(57) ABSTRACT

A microprocessor includes a functional block having dynamic power savings circuitry, a functional block control circuit, and a thermal control unit. The functional block control circuits are capable of altering performance characteristics of their associated functional blocks automatically upon detecting an over temperature condition. The thermal control unit receives an over-temperature signal indicating a processor temperature exceeding a threshold and invokes the one or more of the functional block control units in response to the signal. The functional block control units respond to signals from the thermal control unit by reducing processor activity, slowing processor performance, or both. The reduced activity that results causes the dynamic power saving circuitry to engage. The functional block control units can throttle performance by numerous means including reducing the exploitable parallelism within the processor, suspending out-of-order execution, reducing effective resource size, and the like.

20 Claims, 3 Drawing Sheets

PERFORMANCE THROTTLING FOR TEMPERATURE REDUCTION IN A MICROPROCESSOR

BACKGROUND

1. Field of the Present Invention

The present invention generally relates to the field of microprocessors and more particularly to methods of controlling the amount of heat dissipated by a microprocessor.

2. History of Related Art

As microprocessor designs grow increasingly more complex, they demand a larger functional area and typically consume more power. The area required to implement the necessary features of modem microprocessors has caused the industry to concentrate on moving devices increasingly closer together to limit physical chip sizes and increase clock speed. Because of this trend, power density has become a major consideration in the design of microprocessors. In modem microprocessors, dense packing of heat producing functional blocks and very high clock speeds can cause the generation of more heat than the device is physically capable of dissipating. Unfortunately, it is not always possible to address this problem by simply consuming more space or eliminating selected functional blocks. Therefore, it would be desirable to implement an integrated circuit such as a microprocessor capable of monitoring the heat it produces and taking self-corrective action when the heat exceeds a threshold.

SUMMARY OF THE INVENTION

The identified goal is achieved by a microprocessor having a functional block that includes dynamic power savings circuitry, a functional block control unit, and a thermal control unit. The functional block control units are capable of altering performance characteristics of their associated functional blocks automatically upon detecting an over temperature condition. The thermal control unit receives an over-temperature signal indicating a processor temperature condition exceeding a threshold and invokes one or more of the functional block control units in response to the signal. The functional block control units respond to signals from the thermal control unit by reducing processor activity, slowing processor performance, or a combination thereof. The reduced activity that results causes the dynamic power saving circuitry to engage. The functional block control units can throttle performance by numerous means including reducing the exploitable parallelism within the processor, suspending out-of-order execution, reducing effective resource size, and the like.

BRIEF DESCRIPTION OF THE DRAWINGS

Other objects and advantages of the invention will become apparent upon reading the following detailed description and upon reference to the accompanying drawings in which.

Figure 1:
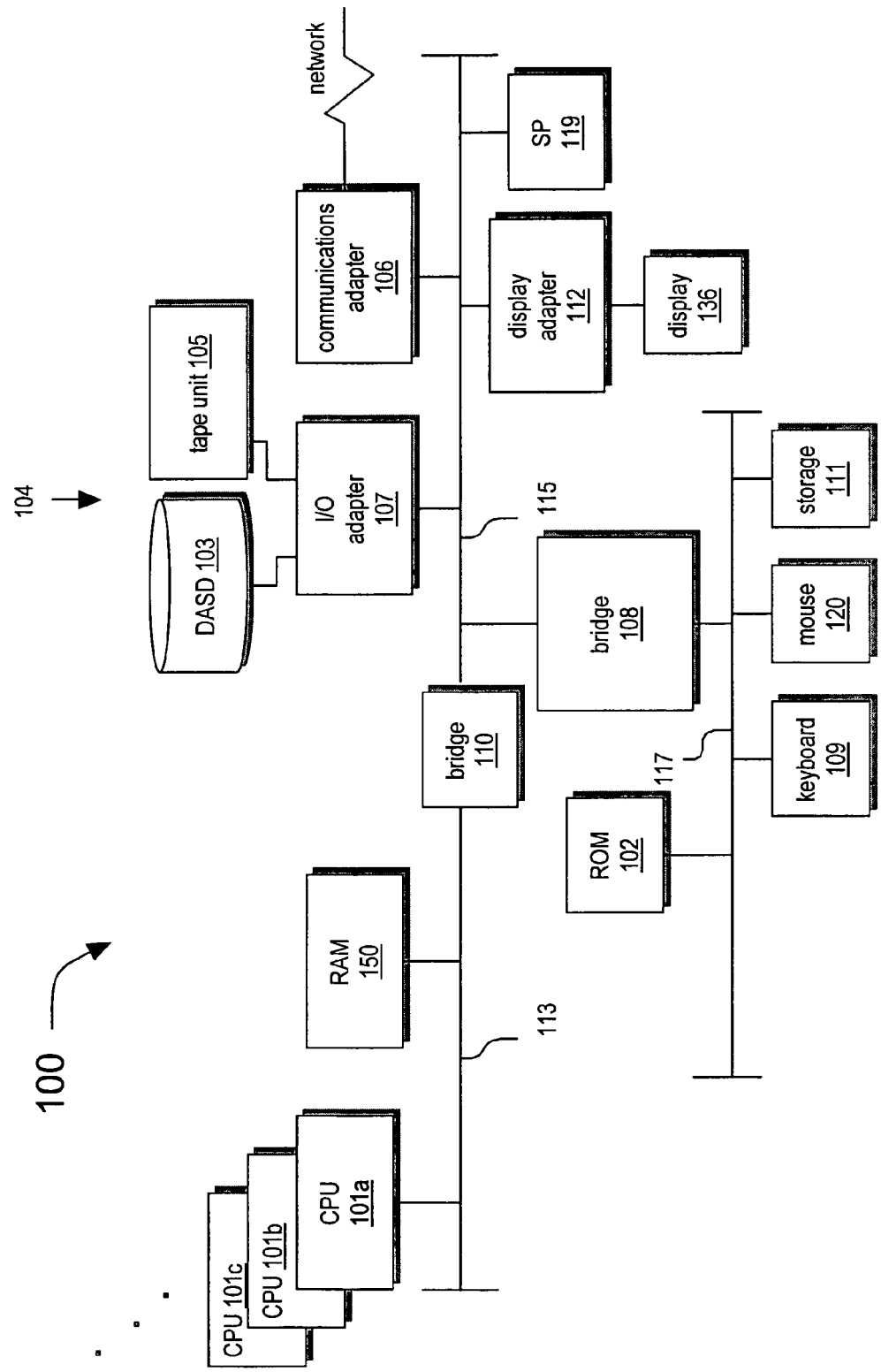
FIG. 1 is a block diagram of selected elements of a data processing system according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention encompasses a microprocessor employing a self-regulating thermal control mechanism. More specifically, the microprocessor includes power saving circuits that engage during periods of reduced processor activity. The processor also includes a thermal control unit that causes the power saving circuits to engage when the processor temperature exceeds some threshold value. The power saving circuits, when engaged, reduce the performance characteristics of the processor to reduce the amount of thermal energy produced by the processor thereby reducing the processor's temperature. When the temperature drops back below a lower threshold, the performance limiting corrections taken to reduce the chip's temperature may be de-activated to restore full functionality and maximum performance to the processor.

Referring now to FIG. 1, an embodiment of a data processing system 100 according to the present invention is depicted. System 100 includes one or more central processing units (processors) 101a, 101b, 10c, etc. (collectively or generically referred to as processor(s) 101. In one embodiment, each processor 101 is implemented as a superscalar, reduced instruction set computer (RISC) microprocessor. Additional information concerning RISC processors generally is available in C. May et al. Ed., *PowerPC Architecture: A Specification for a New Family of RISC Processors*, (Morgan Kaufmann, 1994 2d edition). As depicted in FIG. 1, processor(s) 101 are coupled to a system memory 150 via system bus 113. Those skilled in the design of microprocessor based systems will appreciate that this simplified representation omits an intervening memory controller.

A peripheral bus bridge 110 connects system bus 113 to a peripheral bus 115 representing, for example, a Peripheral Control Interface (PCI) bus. An I/O adapter 107 such as a SCSI controller connects bus 115 with mass storage devices 104 including a direct access storage device (DASD) 103 and/or a tape storage drive 105. A communications adapter or network interface card 106 coupled to the peripheral bus 115 links the system 100 with an external network enabling the system to communicate with other such systems. Display monitor 136 is connected to system bus 113 by display adapter 112, which may include a video controller and a graphics adapter to improve the performance of graphics intensive applications.

A service processor 119 connected to bus 115 provides fault detection, reporting, and correction facilities and other management functionality to system 100. Service processor 119 is configurable to monitor and reset the system's power supplies, temperature sensors, and cooling fans. In one embodiment, service processor 119 is implemented as an adapter card such as a PCI card connected to peripheral bus 115. Service processor 119 may receive a power signal that is distinct from power supplied to the remaining portions of system 100 such that service processor 119 can remain functional while processors 101 and other system facilities are powered down.

Additional input/output devices are shown as connected to bus 115 via a bridge 108 and a second peripheral bus 117 (an ISA bus, for example). A keyboard 109, mouse 120, removable storage drive 111 are all linked to bus 117. A read-only-memory (ROM) 102 coupled to peripheral bus 117 includes a basic input/output system (BIOS) that defines base level controls for the system's devices and is used to boot the system to a known state following a system reset.

Thus, as configured in FIG. 1, system 100 includes processing means in the form of processors 101, storage means including system memory 150 and mass storage 104, input means such as keyboard 109 and mouse 110, and output means including display 136. A portion of system memory 150 and mass storage 104 collectively store an operating system to coordinate the functions of the various components shown in FIG. 1.

Figure 2:
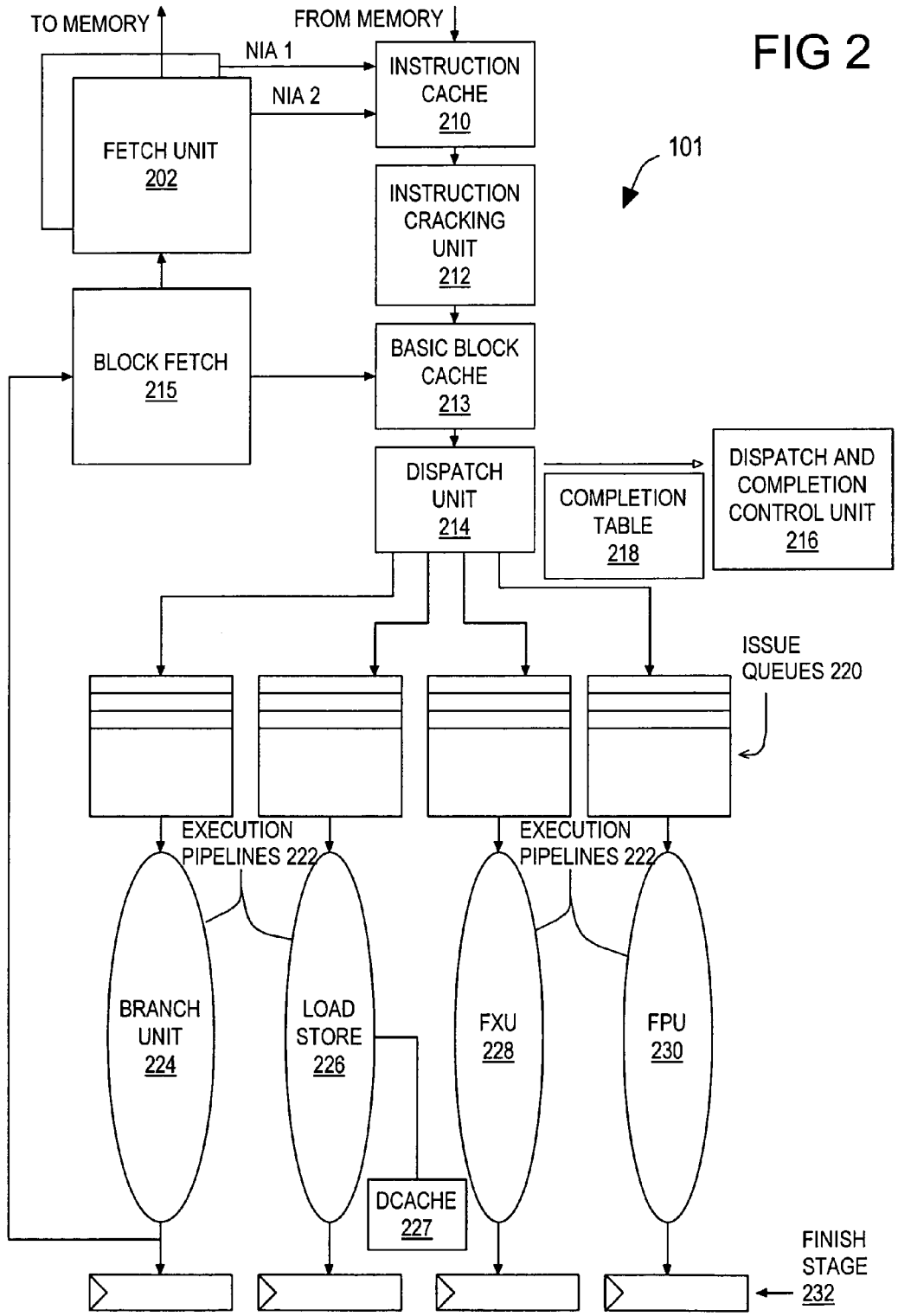
FIG. 2 is a block diagram of selected elements of a microprocessor suitable according to the present invention and suitable for use in the system of FIG. 1.

Turning now to FIG. 2, a block diagram of selected elements of a processor 101 according to one embodiment of the present invention is illustrated. Processor 101 as depicted in FIG. 2 includes at least one instruction fetch unit 202 suitable for generating a next instruction address (NIA) indicating the next instruction to be fetched. The NIA generated by fetch unit 202 is provided to an instruction cache 210. Fetch unit 202 may include branch prediction logic that, as its name suggests, is adapted to make an informed prediction of the outcome of a decision that affects the program execution flow. The ability to correctly predict branch decisions is a significant factor in the overall ability of processor 101 to achieve improved performance by executing instructions speculatively and out-of-order.

The depicted embodiment of processor 101 includes a pair of fetch units 202. In this embodiment, each fetch unit may retrieve code for a corresponding stream of code or "thread." The two threads execute on a common set of resources. Thread tags are attached to the instructions indicating to which thread a particular instruction belongs. Dual threaded processing offers potentially improved processing performance by increasing opportunities for instruction level parallelism.

The NIA's generated by fetch unit(s) 202 are provided to an instruction cache 210, which contains a subset of the contents of system memory in a high speed storage facility. The instructions stored in instruction cache 210 are formatted to or compliant with a first instruction set such as, for example, the PowerPC instruction set. Detailed information regarding the PowerPC® instruction set is available in the *PowerPC 620 RISC Microprocessor User's Manual* available from Motorola, Inc. (Order No. MPC620UM/AD), which is incorporated by reference herein. If an NIA generated by fetch unit(s) 202 corresponds to a system memory address that is currently replicated in instruction cache 210 (i.e., the NIA "hits" in instruction cache 210), instruction cache 210 forwards the corresponding instruction to cracking unit 212. If the NIA generated by fetch unit 202 does not currently reside in instruction cache 210 (i.e., the NIA misses in instruction cache 210), the corresponding instruction must be fetched from a lower level cache memory (not shown) or from system memory 150.

The decode stage of the depicted processor employs cracking facilities unit 212 to modify an incoming instruction stream to produce a set of instructions optimized for executing in an underlying execution pipeline at high operating frequencies (i.e., operating frequencies exceeding 1 GHz). In one embodiment, for example, cracking unit 212 receives instructions in a first, 32-bit wide instruction format such as the PowerPC® instruction set and converts the instructions to a second instruction format that facilitates execution in a high speed execution unit operating in the gigahertz frequency range and beyond. The second format of the instructions generated by cracking unit 212 may be wider than the first instruction format. In this case, the second instruction format may replace, as an example, references or operands that are implied in the first format with explicit operand references. In one embodiment, for example, the format of instructions generated by cracking unit 212 is 64 or more bits wide.

The depicted embodiment of cracking unit 212, in addition to modifying instruction formats, organizes fetched instructions into instruction groups or basic blocks. As used herein, a basic block is block of code that is guaranteed to execute sequentially and is typically terminated by a branch instruction. Organizing instructions into basic blocks facilitates high speed execution by, among other things, simplifying the logic needed to maintain rename register mapping and completion tables for a large number of in-flight instructions.

The basic blocks generated by cracking unit 212 are stored in a basic block cache 213 with the address of the first instruction in the block serving as the basic block's address. In this way, basic block cache 213 stores recently used basic blocks in a manner functionally similar to the storage of recently accessed instructions in instruction cache 210. Basic block cache 213 works in conjunction with a block fetch unit 215 analogous to the manner in which fetch unit 202 works with instruction cache 210. Block fetch unit 215 generates an instruction address that is provided to basic block cache 213. The instruction address provided by block fetch unit 215 is compared against the addresses of basic blocks in basic block cache 213. If the instruction address provided by block fetch unit 215 hits in basic block cache 213, the appropriate basic block is forwarded to issue queues 220. If the address provided by block fetch unit 215 misses in basic block cache 213, the instruction address is fed back to fetch unit 202 to retrieve the appropriate instructions from instruction cache 210.

The depicted embodiment of processor 101 further indicates a dispatch unit 214. Dispatch unit 214 is responsible for ensuring that all necessary resources are available prior to forwarding the instructions in each instruction group to their appropriate issue queues 220. In addition, dispatch unit 214 communicates with dispatch and completion control logic 216 to keep track of the order in which instructions were issued and the completion status of these instructions to facilitate out-of-order execution. In association with dispatch and completion control logic 216, a completion table 218 is utilized in one embodiment of the present invention to track the status of issued instruction groups.

Instructions are issued from dispatch unit 214 to issue queues 220 where they await execution in corresponding execution pipes 222. Processor 101 may include a variety of types of execution pipes, each designed to execute a subset of the processor's instruction set. In one embodiment, execution pipes 222 may include a branch unit pipeline 224, a load store pipeline 226 that accesses a data cache memory 227, a fixed point arithmetic unit 228, and a floating point unit 230. Each execution pipe 222 may comprise two or more pipeline stages. Instructions stored in issue queues 220 may be issued to execution pipes 222 using any of a variety of issue priority algorithms. In one embodiment, for example, the oldest pending instruction in an issue queue 220 is the next instruction issued to execution pipes 222.

Prior to issue, the destination register operand of the instruction is assigned to an available rename GPR (or FPR depending upon the instruction type). When an instruction is ultimately forwarded from issue queues 220 to the appropriate execution pipe, the execution pipe performs the appropriate operation as indicated by the instruction's opcode and writes the instruction's result to the instruction's rename GPR by the time the instruction reaches a finish stage (indicated by reference numeral 232) of the pipeline. A mapping is maintained between the rename GPRs and their corresponding architected registers. When all instructions in an instruction group (and all instructions in younger instruction groups) finish without generating an exception, a completion pointer in the completion table 218 is incremented to the next instruction group. When the completion pointer is incremented to a new instruction group, the rename registers associated with the instructions in the old instruction group are released thereby committing the results of the instructions in the old instruction group. If one or more instructions older than a finished (but not yet committed) instruction generates an exception, the instruction generating the exception and all younger instructions are flushed and a rename recovery routine is invoked to return the GPR mapping to the last known valid state.

If a predicted branch is not taken (branch misprediction), the instructions pending in execution pipes 222 and issue queues 220 are flushed. In addition, a pointer in the basic block cache entry associated with the mispredicted branch is updated to reflect the most recent branch taken.

The functional blocks of processor 101 as described above include many performance optimizing circuits. Fetch unit 202, for example, is configured to perfect data and instructions to insure that the instructions/data are available in instruction cache 210 or data cache 227 when needed for execution. Dispatch unit 214 dispatches instructions into issue queues 220 speculatively. Cracking unit 212 organizes instructions into basic block or instruction groups that typically contain multiple instructions. Data cache 227 may be organized as an n-way cache unit in which a information corresponding to a particular real address may be stored in any of the n ways. Dispatch unit 214 and issue queues 220 issue instructions out of order using rename registers. In addition, processor 101 includes multiple buffers or queues that increase the processor's ability to issue a maximum number of instructions per cycle. These queues includes load and store reorder queues that track issued but outstanding load and store instructions and a branch information queue (BIQ) that tracks pending branch instructions. The depth of each of these and other queues increases the processor's ability to utilize its superscalar architecture.

While each of these architectural features offers improved performance, the resulting performance improvements are achieved at the cost of increased processor heat generation. The ability to execute multiple running threads simultaneously, for example, enables utilization of more processor resources, especially when one of the threads is stalled, thereby resulting a processor that is generally much more active than prior processors that could only execute a single thread. Addressing and, more specifically, reducing the amount of thermal energy produced by high-speed microprocessors is an increasingly important feature of microprocessors.

The present invention addresses the thermal dissipation problem with a minimal impact on existing architecture by leveraging dynamic power saving circuits that shut down various components of a processor when not in use in conjunction with a signal indicating an over temperature condition.

Figure 3:
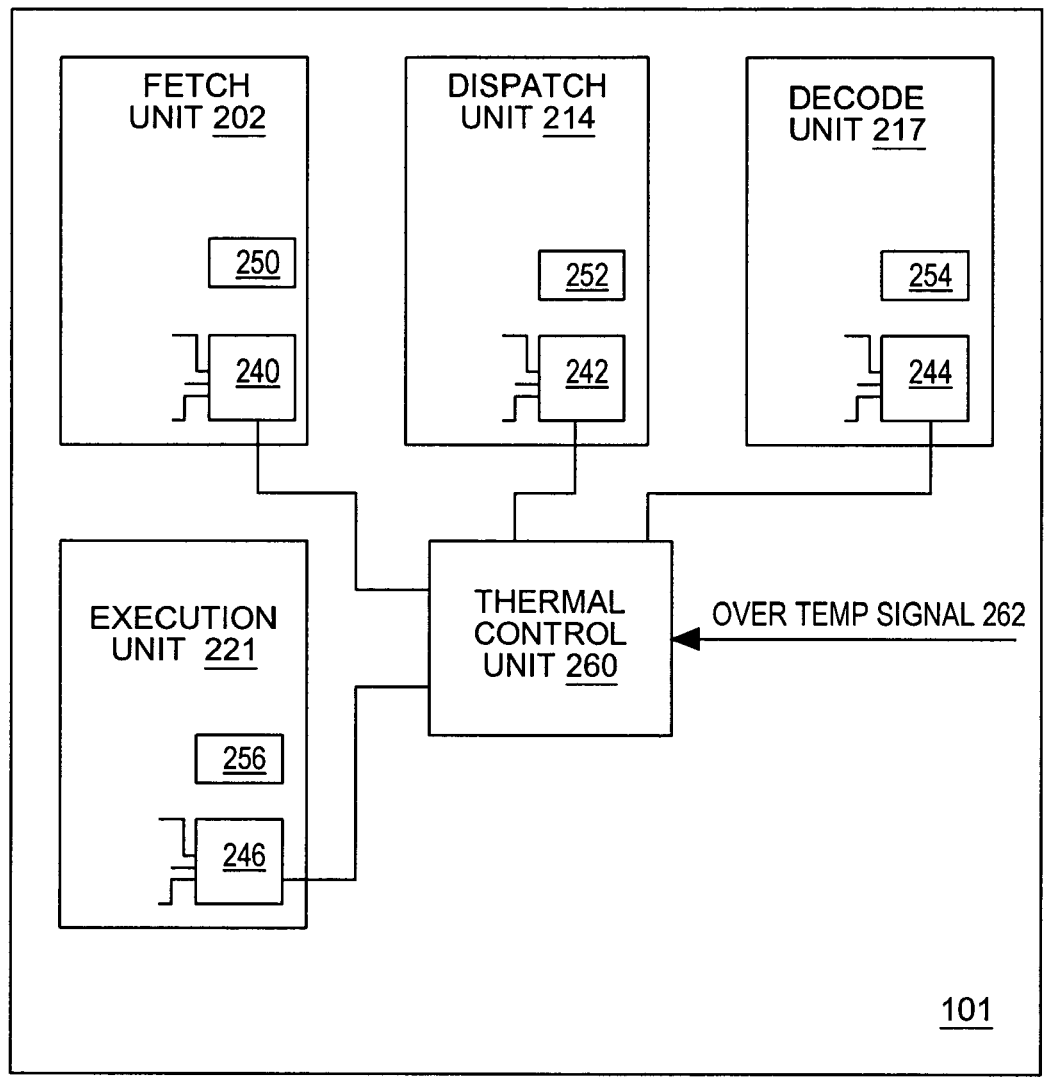
FIG. 3 illustrates selected elements of the processor of FIG. 2 to emphasize the temperature correcting features of the processor.

Referring to FIG. 3, a block diagram of selected elements of processor 101 is presented to emphasize the self-correcting thermal characteristics of processor 101. In this conceptualized representation, processor 101 is illustrated as including various functional blocks or elements including fetch unit 202, dispatch unit 214, an instruction decode unit 217 that includes instruction cracking unit 212, and a generic execution unit represented by reference numeral 221.

In the depicted embodiment, each functional block of processor 101 includes functional block control units 240 through 246 and dynamic power saving circuitry 250 through 256 designed to reduce the power consumed by the respective functional blocks under prescribed operating conditions. Functional block control units 240 through 246 are configured to respond to signals from thermal control unit 260 by taking action that results in reduced processing activity or traffic within the corresponding functional block. Dynamic power saving circuits 250 through 256 are configured to respond to the reduced activity by shutting down portions of the functional block, such as selected pipeline latches, to reduce power consumption. While implementing dynamic power saving circuitry 250 to 256 to activate upon sensing reduced activity is ideal from a performance perspective, the present invention extends the functionality of existing dynamic power saving circuitry by intentionally creating a processing environment, in response to an over-temperature condition, that induces some or all of the power saving circuitry to activate. Inducing the activation of the power saving circuits according to the present invention may be performed either directly or indirectly.

In a direct activation implementation, a temperature control unit that receives an over temperature indicator or signal activates the dynamic power saving circuitry without regard to the level of processing traffic in the functional block. While direct activation is conceptually simple, it invokes the dynamic power saving circuits in a manner that may be contrary to their design and intended use. More specifically, the dynamic power saving circuits are designed to activate during periods of reduced processor activity. Over temperature conditions, in contrast, are commonly associated with periods of high processor activity. If the dynamic power saving circuits include circuits, for example, that shut down one or more latches or latch clocks, and these circuits are activated during a period of high activity, one or more instructions may fail to complete successfully.

Indirect activation of dynamic power saving circuitry according to the present invention is achieved by forcing or imposing periods of low processing activity on one or more of the functional blocks. By intentionally slowing instruction flow in one part of the pipeline, for example, downstream pipelines will also see reduced activity and automatically engage their power saving circuitry in response to the reduced activity. Similarly, reducing the effective size of one or more processor queues may also make downstream units see reduced activity from the queue. Units feeding the queue may tend to back up and stall, also causing power savings circuitry to engage.

In the depicted embodiment, processor 101 includes a thermal control unit 260 that receives an over temperature signal 262. Thermal control unit 260 is connected to functional block control units 240 to 246 . The dynamic power saving circuits themselves are distributed throughout the design of the functional blocks but are shown in FIG. 3 as discreet cells 250 through 256 for the sake of simplicity.

Each functional block control unit is configured to accept "throttling" signals from a thermal control unit 260. Thermal control unit 260 manipulates the functional block control units 240 through 246 of processor 101 based on the state of over temperature signal 262. In an indirect activation implementation, thermal control unit 260 activates one or more of the functional block control units 240 through 246, in response to an assertion of over temperature signal 262, to throttle or reduce the execution performance of processor 101 by reducing the performance capacity of one or more of the processor's functional blocks. Dynamic power saving circuits 250 through 256 sense the reduced activity and respond by activating. Activation of dynamic power saving circuits 250 through 256 reduces the thermal energy generated by processor 101. Thermal control unit 260 monitors the state of over temperature signal 262 to gauge the level and type of performance throttling required.

In one embodiment, thermal control unit is configured to prioritize the available dynamic power savings throttling mechanisms. The prioritization of throttling mechanisms is likely based on factors including the relative effectiveness of each dynamic power savings circuit engaged by the mechanism and the relative "cost" of invoking each power saving mechanism. The relative effectiveness of each dynamic power saving mechanism represents the average or relative amount of thermal energy reduction or savings associated with each circuit that engages while the relative cost represents the expected drop in performance associated with invoking each mechanism. These mechanisms are described in greater detail below.

In some circumstances, thermal control unit 260 prioritizes the order in which power savings mechanisms are activated by prioritizing the circuits that reduce performance the least. In this case, control unit 260 will respond to an initial assertion of over temperature signal 262 by activating the functional block control units 240 through 246 expected to have the least impact on performance. In other circumstances, thermal control unit 260 prioritizes based on the expected thermal savings associated with each power saving circuits. In such cases, control unit 260 responds to an initial assertion of thermal control unit 260 by activating the dynamic power savings circuit that is expected to produce the greatest thermal generation reduction. If the activation of this power savings circuit does not result in the de-assertion of the over temperature condition, thermal control unit 260 would then activated the power savings circuit with the next-most benefit, and so forth.

While there is likely a correlation between the amount of performance reduction and the amount of thermal savings associated with each dynamic power savings circuit, the correlation may not be perfect. If the correlation is imperfect, the ability to prioritize the activation of power savings circuitry beneficially imparts flexibility to the design. If thermal overload is of primary concern, thermal control unit 260 is configured to prioritize based on thermal savings. When maintaining performance is the primary objective, the prioritization is based on the performance cost associated with each dynamic power savings circuit. In one embodiment, thermal control unit 260 is configured to respond to two (or more) overheat conditions, in response to a first "warning level" over temperature condition, performance is prioritized. If a second "critical level" over temperature condition is indicated, maximum heat reduction is then prioritized over performance loss. In this embodiment, over temperature signal 262 includes multiple signals, include a signal for each level of over temperature condition.

In an alternative embodiment, the over temperature signal 262 is indicative of a location of the processor that is experiencing an over temperature condition as described in U.S. patent application by Clabes, et al., entitled Thermally Aware Integrated Circuit, application Ser. No. 10/366,437, filed 13 Feb. 2003 [hereinafter Clabes], which is commonly assigned with the present application and which is incorporated by reference herein. In this embodiment, thermal control unit 260 is configured to select the appropriate functional block control unit based on the proximity of the functional block to the location indicated by the over temperature signal 262. In this embodiment, the processor slows performance where it is most needed geographically.

Thermal control unit 260 receives and responds to an over temperature signal 262. The specifics of generating over temperature signal are implementation specific. In one embodiment, over-temperature signal is a hardware-based, on board signal generated by processor 101. This embodiment is illustrated by the subject matter disclosed in Clabes. In this implementation, temperature sensing cells placed throughout the chip communicate with control circuitry that controls a signal to indicate when the localized temperature in one or more locations of the processor exceed a threshold value. The control circuitry also acts to de-assert the signal when the localized temperatures drop below a lower threshold analogous to the manner in which conventional residential and commercial air conditioning units control monitor and control environmental temperature with a thermostat.

The functional block control units 240 through 246 represent substantially any circuit that responds to a decrease in performance activity within its associated functional element by taking action to minimize power consumption of the functional block. Power consumption minimization is, of course, highly desired in wireless, mobile, and other applications that depend on a battery for power as well as in densely packed computing environments where heat dissipation is a substantial concern.

Examples of selected types of actions that may be invoked by functional block control units 240 to 246 are listed here for illustrative purposes. It will be appreciated that, to the extent a microprocessor employs a dynamic power saving device capable of being activated by an external signal, the specific power saving circuit employed and the unit that controls its activation are within the scope of the present invention.

Processor 101 includes a variety of performance throttling mechanisms to induce the activation of dynamic power saving circuits 250 to 256. Functional block control unit 240 within fetch unit 202 may respond to decreased activity by shutting down data prefetching, instruction prefetching, or both. The control circuit 242 of dispatch unit 214 is enabled to halt the issuing and execution of speculative instructions. The control 244 of decode unit 217 is configured to execute in a mode that restricts the number of instructions in an instruction group formed by cracking unit 212 to a maximum number. If this maximum is one, for example, decode unit 217 and cracking unit 212 will place just one instruction in each instruction group. The control unit 246 of execution unit 221 may be able to force selected instructions to be rejected or "retried" such as all memory reference instructions that flow through a load store execution unit 221.

Each of the functional block control units 240 through 246 may be able to stop or "stall" certain stages in the pipeline of respective functional blocks to introduce "bubbles" in the execution. If greater performance reduction is desired, control units may further be configured to stop one or more of the functional blocks (issue, fetch, or decode)

until a previous instruction (such as the previous instruction in program order) completes or reaches some other specified point in the execution pipeline. Still more dramatically, control units 240 through 246 may cause a processor flush after every N instructions, where N is a predetermined integer greater than or equal to 1.

Other examples of specific actions that may be initiated by functional block control units 240 through 246 include reducing the depth of selected queues or buffers upon which processor 101 depends for high speed operation including any issue queues, load reorder queues, store queues, and branch processing queues. In one embodiment, the secondary (L2) cache may be manipulated to slow down the speed at which data is returned from the cache. Slower cache data returns result in increased wait states in the load/store execution pipeline thereby potentially lowering the amount of heat generated. Control units 240 through 246 may also throttle performance by issuing one or more interrupts requiring interrupt handling. Control units 240 through 246 may include a cycling mechanism in which any of the above performance throttling mechanism is activated for X cycles and deactivated for Y cycles where X and Y are determinable integers.

In another example, a cache control unit associated with data cache 227 may be configured to enter a "direct mapped" execution mode in which only one "way" of an n-way cache is accessible. In a four-way cache, as an example, entering the direct mapped execution mode at the request of thermal control unit 260 will effectively shut down ¾ of the data cache thereby saving considerable power. In one embodiment, the control circuit 242 of dispatch unit 214 is configured to eliminate or greatly reduce the number of rename registers available thereby effectively shutting down out of order execution. The termination of out-of-order execution will result in an inherent drop in performance and the resulting heat production by reducing the amount of available instruction level parallelism.

In each of the described examples, functional block control units 240 through 246 effectively restrict or reduce the processing capacity of the corresponding functional block as a means of activating the dynamic power saving circuits to reduce the temperature. Thermal control unit 260 is also configured to "undo" any corrective taken in response to the over-temperature signal 262. When the processor's temperature drops back below a specified value and the over temperature signal is deasserted, thermal control unit 260 restores the maximum performance capabilities of the processor by backing off any of the corrective actions.

In addition to the indirect throttling techniques described above, the invention encompasses direct throttling embodiments in which thermal control unit 260 activates some or all of the dynamic power saving circuits 250 through 256 directly (i.e., bypassing the intervening control units 240 through 246). As noted in above, direct throttling must account for potential incorrect execution that may occur when clocks and/or latches are suddenly stopped in a filled-to-capacity pipeline or execution unit. With indirect throttling, over temperature signal 262 is used to modify the performance of processor 101 in an effort to give a dynamic power saving circuit the opportunity or environment to activate. Indirect throttling is desirable both because it leverages existing dynamic power saving circuits and because it does not raise concerns that arise when circuits intended to activate only when processor activity or traffic is low are activated at times of peak performance.

It will be apparent to those skilled in the art having the benefit of this disclosure that the present invention contemplates a microprocessor enable to take action in response to an over temperature condition to cool itself by intentionally throttling its performance. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A microprocessor, comprising:
a set of data processing functional blocks including a first data processing functional block;
a power saving circuit associated with the first data processing functional block and configured to reduce power consumption by the first data processing functional block in response to processing activity in the first data processing functional block being below an activity threshold; and
a thermal control unit configured to receive an over temperature signal indicative of a processor temperature exceeding a temperature threshold and further configured to selectively force processing activity in the first data processing functional block to decrease below the activity threshold,
wherein the thermal control unit is configured to force processing activity below the activity threshold by activating a functional block control unit configured to reduce the processing activity of the first data processing functional block;
wherein the functional block control unit includes means selected from the group of means consisting of means for halting the prefetching of instructions and data, means for halting speculative execution, means for preventing the formation of instruction groups exceeding a single instruction, means for forcing a retry of selected instructions including memory reference instructions, means for flushing the processor after N instructions have executed where N is an integer greater than zero, means for reducing the depth of a processing queue within the functional block, means for disabling access to portions of a data cache, and means for reducing the number of available rename registers thereby reducing out-of-order execution.

2. The microprocessor of claim 1, wherein the thermal control unit is further configured to activate the power saving circuit directly regardless of the processing activity in the first data processing functional block.

3. The microprocessor of claim 1, wherein the functional block control unit is configured to reduce the functional block activity by inserting bubbles into an execution pipeline.

4. The microprocessor of claim 1, wherein the functional block control unit is enabled to insert stalls at selected stages in the functional block's pipeline.

5. The microprocessor of claim 1, wherein the over temperature signal is indicative of a location of the microprocessor experiencing the over temperature condition and further wherein the thermal control unit is configured to activate a selected functional block control unit of a functional block in proximity to the indicated location.

6. The microprocessor of claim 1, wherein the thermal control unit is configured to prioritize the selection of a functional block control unit based on the relative performance cost associated with the functional block control units.

7. The microprocessor of claim 1, wherein the thermal control unit is configured to prioritize the selection of a functional block control unit based on the relative temperature reduction associated with the functional block control units.

8. A method of dynamically reducing heat generated by a microprocessor, comprising:
monitoring for a signal indicating an over temperature condition;
responsive to an assertion of the over temperature condition, invoking a first functional block control unit to reduce the level of processing activity in a corresponding functional block; and
activating dynamic power saving circuit in response to the level of processing activity in the functional block dropping below a determined activity threshold; and
responsive to a de-assertion of the over temperature condition signal, resuming normal processing activity;
wherein invoking the first functional block control unit is further characterized as prioritizing a set of available functional block control units and invoking the first functional block control unit based on the priority.

9. The method of claim 8, wherein the signal indicating an over temperature condition is indicative of a location within the microprocessor that is over temperature and wherein invoking a functional block is further characterized as invoking a functional block in proximity to the indicated location.

10. The method of claim 8, wherein prioritizing the functional block control units is further characterized as prioritizing the units according to a performance criteria.

11. The method of claim 8, wherein prioritizing the functional block control units is further characterized as prioritizing the units according to a thermal generation criteria.

12. A microprocessor, comprising;
a set of data processing functional blocks wherein a first data processing functional block in the set of data processing blocks includes:
a first power saving circuit configured to reduce power consumption by the first data processing functional block in response to processing activity in the first data processing functional block being below an activity threshold; and
a first functional block control unit configured to reduce processing activity of the first data processing functional block;
a thermal control unit configured to receive an over temperature signal indicative of a processor temperature exceeding a temperature threshold and, responsive thereto, to select the first functional block control unit to cause processing activity of the first data processing functional block to decrease below the activity threshold;
wherein the thermal control unit is configured to select the first functional block control unit from a plurality of functional block control units based on a criteria selected from the group of criteria consisting of the relative performance cost associated with each of the functional block control units and the relative temperature reduction associated with each of the functional block control units.

13. The microprocessor of claim 12, wherein the functional block control unit includes means for halting the prefetching of instructions and data.

14. The microprocessor of claim 12, wherein the functional block control unit includes means for halting speculative execution.

15. The microprocessor of claim 12, wherein the functional block control unit includes means for preventing the formation of instruction groups exceeding a single instruction.

16. The microprocessor of claim 12, wherein the functional block control unit is enabled to force a retry of selected instructions including memory reference instructions.

17. The microprocessor of claim 12, wherein the functional block control unit is enabled to flush the processor after N instructions have executed where N is an integer greater than zero.

18. The microprocessor of claim 12, wherein the functional block control unit is enabled to reduce the depth of a processing queue within the functional block.

19. The microprocessor of claim 12, wherein the functional block control unit includes means for disabling access to portions of a data cache.

20. The microprocessor of claim 12, wherein the functional block control unit includes means for reducing the number of available rename registers thereby reducing out-of-order execution.

* * * * *